United States Patent [19]

Nirschl et al.

[11] Patent Number: 4,639,909
[45] Date of Patent: Jan. 27, 1987

[54] DIGITAL SIGNAL DISTRIBUTOR

[75] Inventors: Heinrich Nirschl, Munich; Klaus Kamp, Neuried; Baldur Stummer, Munich, all of Fed. Rep. of Germany

[73] Assignee: Siemens Aktiengesellschaft, Berlin and Munich, Fed. Rep. of Germany

[21] Appl. No.: 651,862

[22] Filed: Sep. 18, 1984

[30] Foreign Application Priority Data

Sep. 19, 1983 [DE] Fed. Rep. of Germany ....... 3333775

[51] Int. Cl.$^4$ ........................................... H04Q 11/04
[52] U.S. Cl. ....................................... 370/58; 370/55
[58] Field of Search ................. 370/55, 58, 110.1, 112

[56] References Cited

U.S. PATENT DOCUMENTS

| | | | |
|---|---|---|---|
| 3,997,728 | 12/1976 | Duquesne et al. | 179/15 |
| 4,105,869 | 8/1978 | Aveneau et al. | 370/55 |
| 4,107,469 | 8/1978 | Jenkins | 370/55 |
| 4,434,485 | 2/1984 | Huffman et al. | 370/55 |
| 4,488,287 | 12/1984 | Carter et al. | 370/58 |

OTHER PUBLICATIONS

"Hierarchie der Digital-Ubertragungssysteme und CCITT-Normen" (Hierarcy for Digital Transmission System and CCITT-Standards, Telcom Report 2 (1979), pp. 16-20.
"Kennzeichenumsetzer zur Ubertragung vermittlungstechnischer Zeichen in Digital-Fernsprechverbindungen" (Identifier-Converter for Digital Transmission System of Exchange-Oriented Characters in Digital Telephone Calls), Telcom Report 2 (1979), pp. 65-71.
"Zeitmultiplex-System PCM30F for Subscriber Termination System Apparatus PCM30F-S), Siemens Publication Order No. S42022-A15-A1-1-29 (p. 5).

*Primary Examiner*—Douglas W. Olms
*Attorney, Agent, or Firm*—Hill, Van Santen, Steadman & Simpson

[57] ABSTRACT

A digital signal distributor for time division multiplex signals having the same frame format and for discrete channel signals has frame adaptors for synchronizing and storing the time division multiplex signals, and memories for the discrete channel signals, the frame adaptors and memories being provided following the inputs for the time division multiplex channels. The circuit further includes a distributor unit having an operator interface connected to the frame adaptors and the memories by first bus lines and first discrete lines. A clock pulse generator controls cyclical feeding of the stored code words into the first bus and first discrete lines. Second bus and second discrete lines are connected to an output of the distributor unit and transmit the time division multiplex output signals and the discrete signals to outputs of the circuit.

31 Claims, 10 Drawing Figures

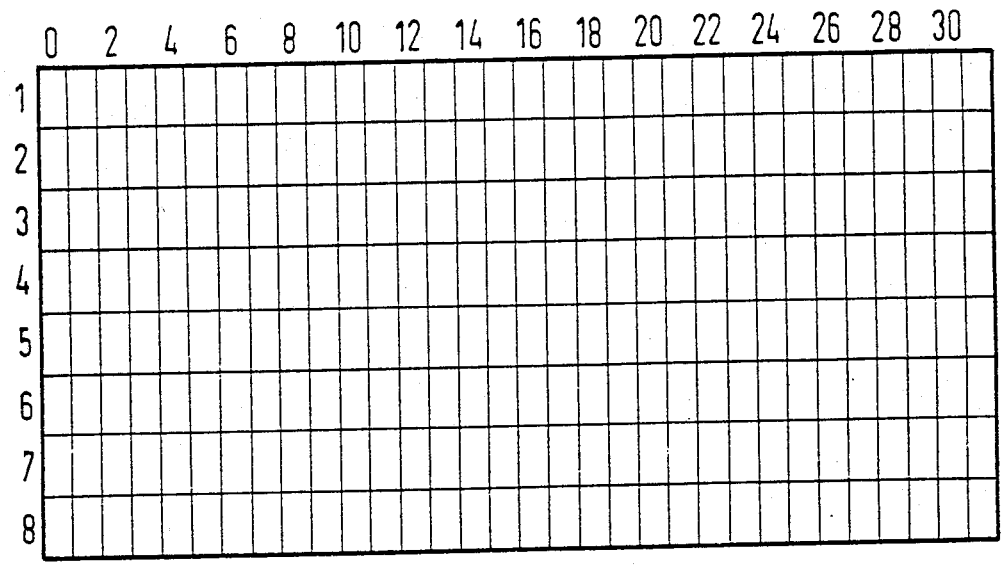
FIG 3
FIG 4
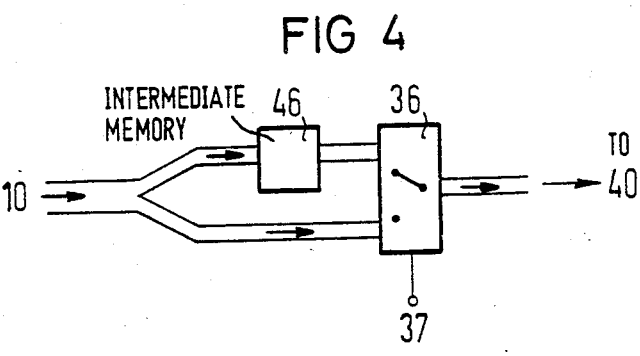
FIG 5
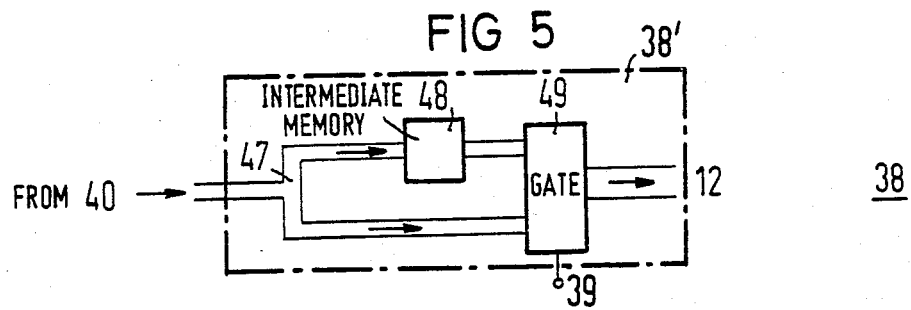

DIGITAL SIGNAL DISTRIBUTOR

BACKGROUND OF THE INVENTION

1. Field of the Invention

The present invention relates to digital signal distributors for time division multiplex signals having the same frame format and for single-channel signals.

Basic systems encompassing 24 or 30 channels are known in the art for time division multiplex signals for transmitting voice or data. A number of such channels of a pulse frame are combined for audio programs. Higher hierarchy levels can be formed from these time division multiplex signals by means of Cigitial signal multiplexers. Video and picture telephony signals are also transmitted at these levels. Such a system is described, for example, in "Telcom-Report", 2 (1979) Special Issue, Digital Transmission at pages 16–20. Parallel signaling transmission required for voice signal transmission is described in the same periodical at pages 65–71.

In such known systems, given time multiplex combination of signals, full occupation of the defined pulse frame is not always guaranteed. This problem leads to uneconomical network structuring.

A channel distributor of the type described above is disclosed in German patent No. 2,538,392, corresponding to U.S. Pat. No. 3,997,728. This system does not include any frame adaptation means. As a consequence, transmission without information omission or repetition is possible only given a maximum jitter or drift of one bit, and only given synchronous time division multiplex signals. Information omission or repetition occurs in a frame at a random location. As a result thereof, the integrity of the frame, that is, the source of all byte values of the frame from the same scan cycle, is impaired.

As used herein, the term "jitter" means phase fluctuations having frequencies above approximately 0.01 Hz, and the term "drift" as used herein means frequencies below this frequency. Frame integrity exists when all byte values of a frame are derived from the same time unit.

SUMMARY OF THE INVENTION

It is an object of the present invention to provide a digital channel distributor circuit which operates without data omission or repetition at higher values of jitter an drift then heretofore possible, and wherein the possible occurence of such jitter or drift does not comprise the frame integrity.

The above objects are inventively achieved in a circuit which receives time division multiplex signals having the same frame format and discrete-channel signals at different inputs, and which has a frame adaptation means for synchronization and storage of the time division multiplex signals, and memories for the discrete-channel signals. Both the frame adaptation means and the memories are provided following the inputs for the time division multiplex signals. A distributor means, including an operator interface, is connected to the frame adaptation means and the memories via a first data bus and first discrete lines. A clock pulse generator controls cyclical feeding of the stored code words into the first data bus or the first discrete lines. The distributor means has outputs connected to a second bus line and to second discrete lines for transmitting the distributed signals to outputs of the circuits. Frame formers may be interconnected between the outputs of the distributor means and the circuit outputs.

The frame adaptation means may include serial-to-parallel converters, however, such converters may be included in the distributor means. Similarly, parallel-to-serial converters may be provided in the frame formers and before the discrete channel outputs, or such converters may be provided in the distributor means.

A distributor means and/or frame formation means having the capability for insertion of auxiliary signals such as indicator bits or bits for an expanded synchronization procedure into the time division multiplex signals are preferable, given a channel distribution of time division multiplex signals.

In one embodiment, the distribution means has a read-write memory having data inputs connected to the first bus, and having data outputs connected to the second bus. The distributor means also includes a first change-over means, having first inputs connected to a write address counter and having second inputs connected through a distributor setting means, such as a RAM, to a read address counter, the outputs of the first change-over means being connected to the address inputs of the write-read memory.

Given 2.048 Mbit/s time division multiplex signals as occur in PCM 30 systems, the sixteenth channel may be a signaling channel which contains two 4-bit code words per basic frame, the code words being respectively allocated to an 8-bit voice channel. Distribution of the signaling code words in the circuit disclosed and claimed herein under such circumstances is preferably undertaken by a signaling write-read memory, a second changeover means having first inputs connected to the first four leads of the first bus, and having second inputs connected to four additional leads of the first bus and having outputs connected to the data inputs of the signaling read-write memory. A third changeover means is also provided having inputs connected to the data outputs of the signaling read-write memory, the third changeover means having first outputs connected to the first four leads of the second data bus and having second outputs connected to four additional leads of the second data bus. A fourth changeover means is also provided having first inputs connected to the first data bus through a signaling synchronization means and through a signaling write address counter, and having second inputs connected to a signaling read address counter through the distributor setting means, and having outputs connected to the address inputs of the signaling write-read memory.

If a signaling read-write memory is provided for 8-bit identifiers consisting of 4-bit words and transmitted in a double signaling (or identifier) frame, a signaling synchronization means is provided for this double signaling frame, and a signaling write address counter is provided for writing the 8-bit identifier into the signaling write-read memory.

If a signaling write-read memory is provided for 4-bit identifiers transmitted in a signaling frame, it is preferable to provide a signaling synchronization means for this signaling frame and to further provide a signaling write address counter for writing the 4-bit identifiers into the signaling write-read memory Signaling transmission principles which form the background for the circuit disclosed and claimed herein are described, for example, in the Siemens publication "Zeitmultiplex-System PCM30F fuer Teilnehmeranschluss Systemgeraet PCM30F-S," page 5, order number S42022-A15-A1-1-29.

The digital signal distributor disclosed and claimed herein is useful, for example, for processing the 8-bit identifiers and may be switched for processing 4-bit identifiers (individual processing for the 2 Mbit/s time division multiplex signals) by means of a suitable setting stored in the read only memory in addition to the distribution assignments.

In a further embodiment a fifth changeover means may be provided having first inputs connected to the outputs of the read address counter, and having second inputs connected to the signaling read address counter, and having third inputs connected to an addressing means and having outputs connected to the addressing inputs of the distributor setting means.

In order to ensure that the distributor setting is not lost during outage of the supply voltage, a read only memory with a logic unit is preferably employed having data inputs connected to the data outputs of the distributor setting means, and having data outputs connected to the data inputs of the distributor setting means, and having addressing inputs connected to the outputs of the addressing means and optionally having setting inputs.

Random access memories are preferably utilized as the write-read memory, the signaling write-read memory, and/or the distributor setting means. Such memories may have data inputs which also function as data outputs, requiring a corresponding adaptation of the first and second buses.

The write address counter, the signaling read address counter, and the read address counter may be combined as a counter unit.

Additionally, in order to eliminate the influence of transit times on the first bus, it is preferable that one input of the second changeover means be preceded by a 4-bit intermediate memory.

The third changeover means may be modified to include a branching from the data bus, both branches being supplied to the third changeover means, and one branch having a 4-bit intermediate memory.

The read only memories used herein may be EPROMs (erasable programmable read only memory) which may be electrically erasable (EEPROM) or erasable with ultraviolent light (UV-EPROM).

Remote operation of the digital signal distributor disclosed and claimed herein via a bit reserved for national use in the indicator word of the 2.048 Mbit/s frame is possible when the operator interface is preceded by an AND gate the AND gate having one input connected to the first bus or to a discrete line which carries a bit for remote setting, the other input of the AND gate being connected to the clock pulse generator.

The distribution circuit disclosed and claimed herein in a further embodiment may include a check bit generator provided at the first bus or the corresponding discrete lines, the check bit generator attaching a check bit to the parallel code words. Error evaluation means are provided at the input and/or the output side of the distributor means for recognizing errors. A check bit generator may further be provided at a first signaling bus or corresponding discrete line, the check bit generator in this embodiment attaching a check bit to the parallel identifier code words, and suitable evaluation means are provided at the output side of the signaling write-read memory.

If 8.448 Mbit/s multiplex signals or multiplex signals of higher hierarchy levels are to be distributed, it is preferable to first resolve these signals into 2.048 Mbit/s time division multiplex signals by the use of a demultiplexer before the signals are supplied to the channel distributor. Suitable multiplexers must then be connected at the other side of the circuit following the outputs.

DESCRIPTION OF THE DRAWINGS

FIG. 3 is a schematic representation of the memory occupation of the read-write memory shown in FIG. 2.

FIG. 4 is a block diagram of a modified changeover means at the input of the signaling write-read memory.

FIG. 5 is a block diagram of a modified changeover means at the output of the signaling write-read memory.

DESCRIPTION OF THE PREFERRED EMBODIMENTS

Figure 1:
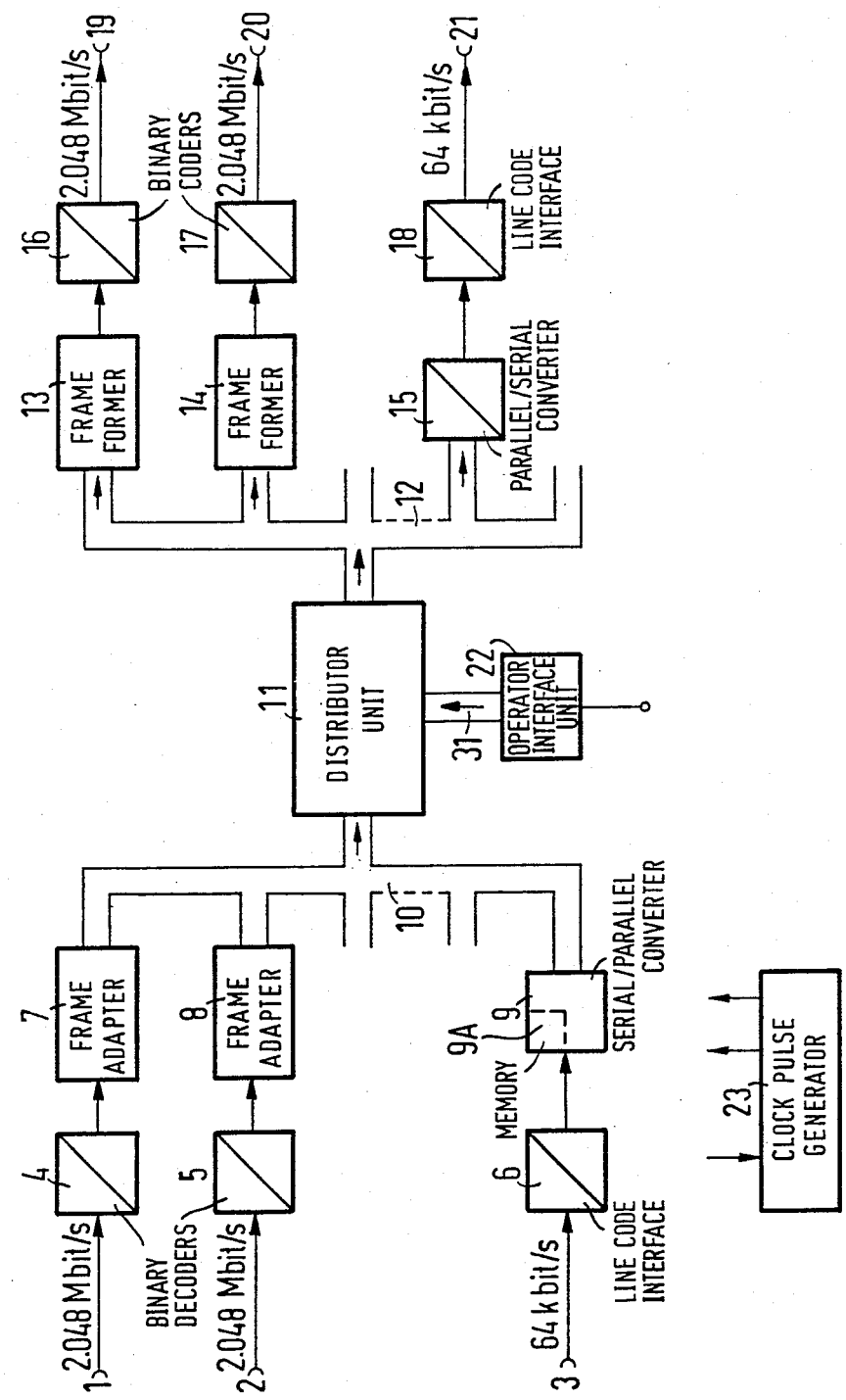
FIG. 1 is a block circuit diagram of a digital signal distributor circuit constructed in accordance with the principles of the present invention.

A digital signal distributor constructed in accordance with the principles of the present invention is shown in FIG. 1. The circuit shown in FIG. 1 has three inputs 1, 2, and 3, however, it will be understood that many more inputs may be provided as needed, three inputs being shown for simplicity.

Inputs 1 and 2 receive 2.048 Mbit/s time division multiplex signals, and input 3 receives a 64 kbit/s discrete channel signal. Corresponding outputs 19 and 20 receive 2.048 Mbit/s time division multiplex signals after distribution by the circuit for transmission thereof, and corresponding output 21 transmits a 64 kbit/s discrete channel signal. Discrete channel signals having a multiple bit rate may also be received and emitted by the circuit disclosed and claimed herein.

The inputs 1 and 2 are connected to binary decoders 4 and 5 having outputs connected to inputs of respective frame adaptors 7 and 8. The input 3 is connected to a line code interface unit 6, having an output connected to a serial/parallel converter 9 having a memory 9A. The outputs of the frame adaptors 7 and 8 and the converter 9 are conducted via a first bus 10 to inputs of a distributor unit 11. The distributor unit 11 has an operator interface unit 22 connected thereto. The outputs of the distributor unit 11 are supplied via a second data bus 12 to a parallel/serial converter 15 and to frame formers 13 and 14. The outputs of the frame formers 13 and 14 are connected to inputs of respective binary coders 16 and 17, and the output of the converter 15 is connected to the input of a line code interface unit 18. A clock pulse generator 23 controls cyclical feeding of the stored code words into the first bus 10.

The line code interface units 6 and 18 may be replaced with coders or decoders for low frequency discrete channel signals at the input 3 and the output 21 if necessary.

The 2.048 Mbit/s time division multiplex signals are supplied to the frame adaptors 7 and 8. Signal synchronization, a serial-to-parallel conversion, and frame storage occurs in each frame adaptor 7 and 8. The 64 kbit/s discrete channel signal incoming via the input 3 is supplied through the line code interface 6 to the converter 9 and is stored in the memory 9A therein. The clock pulse generator 23 cyclically calls the 8-bit code words stored in the frame adaptors 7 and 8 and in the memory 9a. The code words are conducted via the bus 10 to the distributor unit 11. In accordance with an addressing input received from the operator interface 22, the 8 bit code words, that is, the channels, are called in a new sequence and supplied to the bus 12. The frame formers 13 and 14 are required only when the code words on the data bus 12 are to be ordered according to the various outputs, but are not yet ordered according to the channels for time division multiplex signals. Only a parallel-to-serial converter 15 need be provided for the discrete channel signals. Acceptance of the code words respectively intended for a particular output is controlled by the clock pulse generator 23. The code words are also line-coded by the converters 16 and 17 and by the interface unit 18.

The circuit shown in FIG. 1 effects a distribution, for example, such that channels from the time division multiplex signal at the input 1 appear at both of the outputs 19 and 20 as well as at the output 21. Channels from the time division multiplex signal at the input 2 appear at the outputs 19 and 20, and the discrete channel signal at the input 3 is conducted to the output 20.

Although components comprising the elements shown in FIG. 1 may be selected to meet varying system requirements in a manner known to those skilled in the art after the elements are identified, the following is an exemplary embodiment of the circuit shown in FIG. 1 employing commercially available integrated modules. The binary decoders 4 and 5 and the binary coders 16 and 17 may be HDB3 converters formed by integrated modules CD22103 sold by RCA, or module MJ1471 sold by Plessey. The frame adaptors 7 and 8 may be integrated modules PEB2030 manufactured by Siemens. The line code interface units 6 and 18 may be integrated modules MB60203 also manufactured by Siemens. The serial-to-parallel converter 9 may be an integrated module 74LS164 or 74LS259. The parallel-to-serial converter 15 may be an integrated module 74LS165 or 74LS151. The frame formers 13 and 14 may be integrated modules MJ1444 manufactured by Plessey, and the clock pulse generator may be comprised of integrated modules 74LS161, 74LS138 and 74LS193. The details of operation and components comprising the distributor unit 11 and the operator interface 22 are described below with reference to FIG. 2 and FIG. 9.

Figure 2:
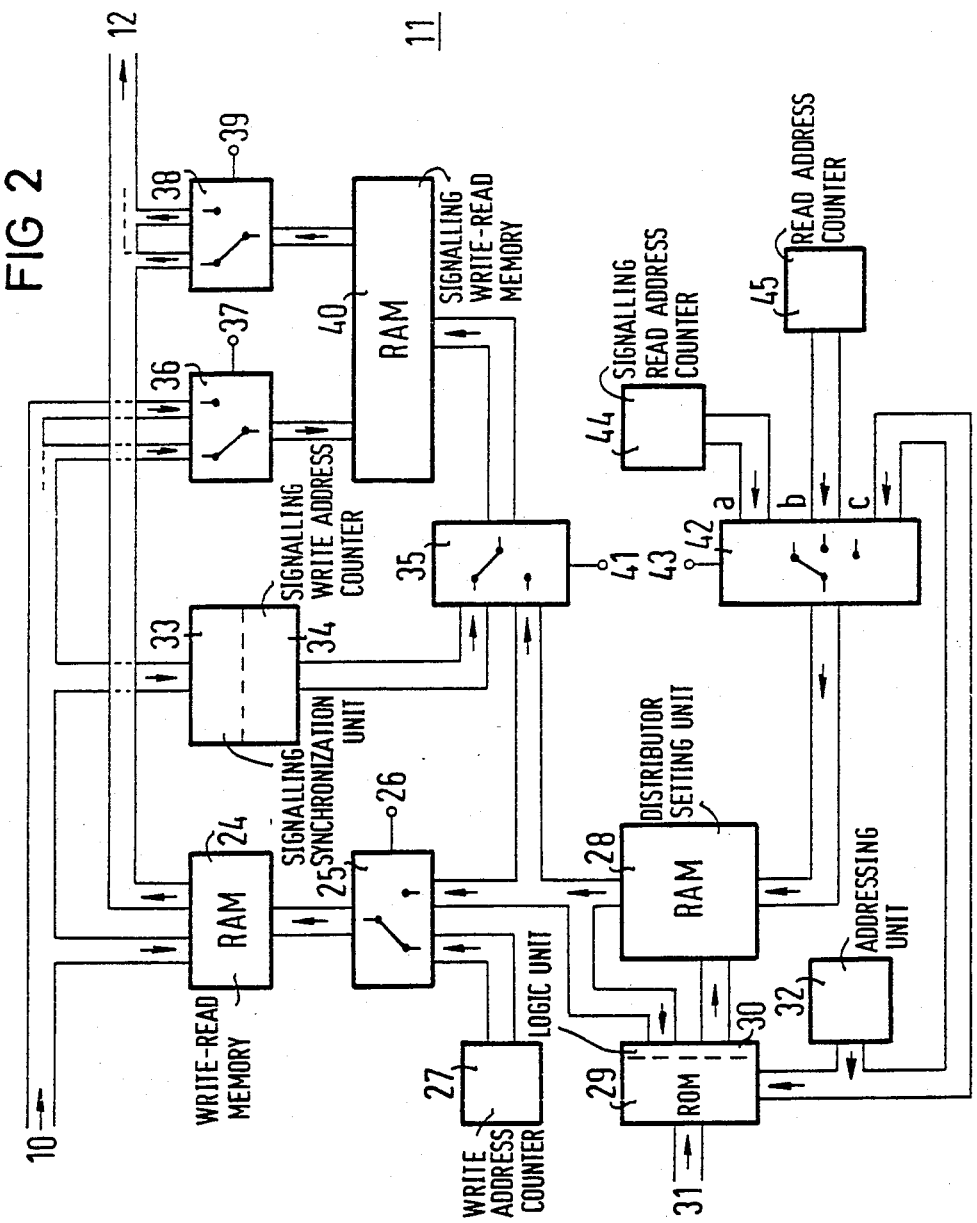
FIG. 2 is a block diagram of the distributor unit shown in FIG. 1.

The details of a distributor unit 11 suitable for use in the circuit shown in FIG. 1 are set forth in FIG. 2. The unit includes a write-read memory 24, a signaling write-read memory 40, a distributor setting unit 28 changeover units 25, 35, 36, 38, and 42 in the form of switches having respective control inputs 26, 41, 37, 39 and 43, a write address counter 27, one or more signaling write address counters 34, a read address counter 45, a signaling synchronization unit 33, a read only memory 29 having an associated logic unit 30 and inputs receiving signals on bus 31 from the operator interface unit 22, and an addressing unit 32.

The distribution assignments or commands are entered via the bus 31 into the memory 29 and are therein protected against information loss upon the occurrence of an outage of the operating voltage. For the actual distribution, the contents of the memory 29 are transferred to the faster distributor setting unit 28 by means of the addressing unit 32. This transfer occurs periodically and is checked by interum readouts.

Code words incoming via the bus 10 are entered in the write-read memory in accordance with the memory occupation diagram shown in FIG. 3 by means of the write address counter 27. In FIG. 3, the channel numbers are shown horizontally and the input numbers appear vertically. An 8-bit code word is rolled-in in parallel for each input. Code words are alternatingly forwarded to the bus 12 from the write-read memory 24 on the basis of addresses proceeding from the read address counter 45 to the distributor setting unit 28. A 2.048 MHz clock pulse sequence is supplied to the control input 26 of the changeover means 25 for switching from the write address counter 27 to the read address counter 45.

The signaling code words incoming in the 16th channel require special handling because these words consist of two 4-bit code words which arise from a signaling frame (sometimes referred to as a "superframe"). The changeover means 36 connects either the first four or the second four leads of the bus 10 to the data inputs of the signaling read-write memory 40. After signaling synchronization has occurred in the unit 33, the signaling write address counter 34 defines the location for the pending 4-bit signaling code words to be written into the signaling write-read memory. Readout and distribution are effected by the signaling read address counter 44 through the distributor setting unit 28. Switching from write to read is effected by an 8 kHz clock pulse sequence supplied to the control input 41 of the changeover means 35. Output occurs through the changeover means 38, alternating between the first four and to the second four leads of the bus 12. The changeover means 36 and 38 are similarly switched by 2.048 MHz clock pulse sequences supplied to the respective control inputs 37 and 39. A control voltage at the input 43 of the changeover means 42 causes the inputs c to be connected to the ouput of the changeover means 42 during one-half of a switching cycle, whereas the input b is connected during the other half. The input a is connected to the output of the changeover means 42 only for the 16th channel.

Figure 8:
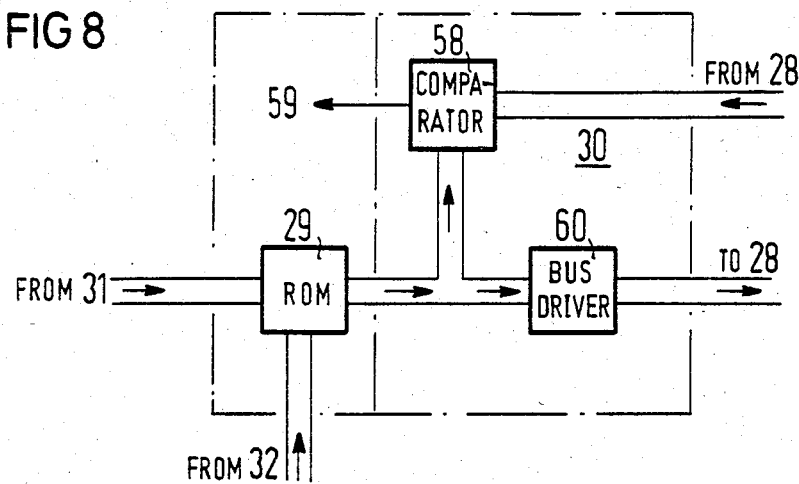
FIG. 8 is a block diagram showing the details of the read only memory used in the embodiments of FIGS. 1 and 6.

The elements shown in FIG. 2 comprising the distributor unit 11 may be realized by commercially available integrated modules. The write-read memory 24, the distributor setting unit 28, and the signaling write-read memory 40 may be realized by module 2114 manufactured by Intel. The changeover means 25, 35, 36, 38 and 42 may be modules 74LS157 and 74LS158. The write address counter 27, the addressing unit 32, the signaling write address counter 34, the signaling read address counter 44, and the read address counter 45 may be modules 74LS161 and 74LS193. The read only memory 29 may be realized with any one of modules 2764 or 2716 or 2817 manufactured by Intel. The details of the logic unit 30 are shown in FIG. 8 and are described in greater detail below.

Signaling synchronization performed by the signaling synchronization unit 33 is undertaken as is known from the Siemens manual "System-Einsatz PCM30F-E & M," order number . S42023-A734-A101-01-77, September 1983.

When octet identifiers are formed from two successive 4-bit identifiers allocated to one channel, two successive identifier frames are formed. The identifier frame which carries the higher-order 4-bit identifier is marked by means of a logical zero at the fifth bit of the first code word in the identifier frame. The incoming identifier frames are usually not synchronous. For example, in the identifier frame for the 2.048 Mbit/s signal at the input 1 in FIG. 1, only first octet halves are received, however only second octet halves are received in the 2.048 Mbit/s signal at the input 2, and are thus written into the signaling write-read memory in FIG. 2. Upon readout from this memory, only first octet halves are available at this point in time from the first 2.048 Mbit/s signal, and only second octet halves are available from the second 2.048 Mbit/s signal. The fifth bit in the identifier frame to be sent, however, defines for all thirty signaling channels whether they are first or second octet halves. The signaling write-read memory 40 must therefore be divided into a memory half for first octet halves and a memory half for second octet halves so that the respective most recently received first and second octetC halves are available for every received 2.048 Mbit/s signal at every point in time. A modification of the connection of the bus 10 to the changeover means 36 is shown in FIG. 4. The bus 10 is branched and the first four leads thereof are conducted to an intermediate memory 46 which stores the transmission (thus effecting a delay) for one clock period. The influence of transit times on the bus 10 is thus eliminated as a result of this measure.

A modified changeover means 38' is shown in FIG. 5 having a branching node 47 and an intermediate memory 48 for storing 4 bits for one clock period, and a gate circuit 49 connected to each of the branches.

Figure 6:
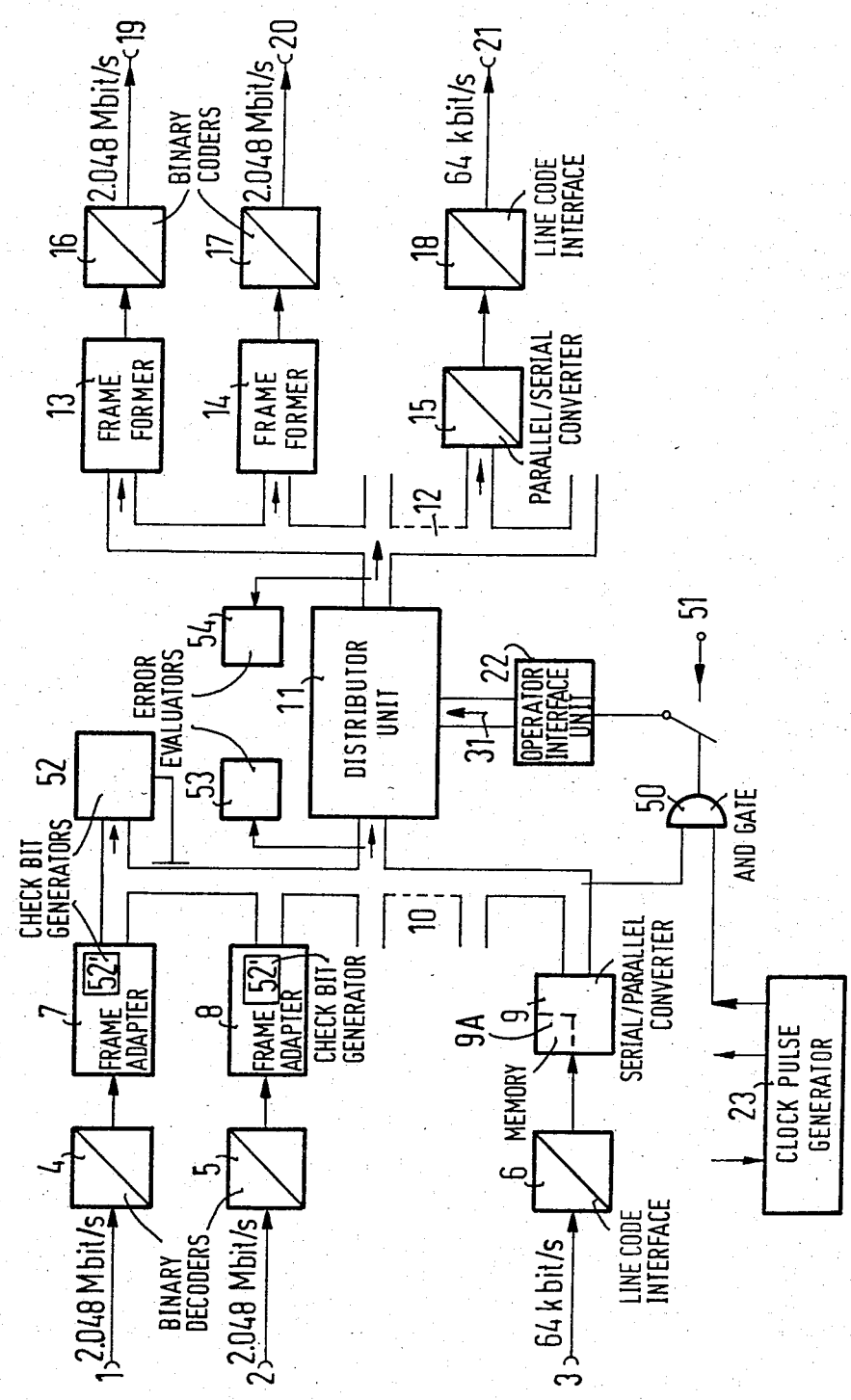
FIG. 6 is a block diagram of a further embodiment of a digital signal distributor constructed in accordance with the principles of the present invention with error recognition capability.

A further embodiment of a digital signal distributor is shown in FIG. 6. Elements which are the same as those already identified and discussed in connection with FIG. 1 are identified with the same reference numerals. In the embodiment shown in FIG. 6, remote setting can be accomplished by means of an AND gate 50. The 2.048 Mbit/s signals at the inputs 1 and 2 contain bits in the indicator word of their frames which are reserved for national use, one of which is employed for remote setting. At the point in time defined by the clock pulse generator 23, connected to the AND gate, this bit is taken from the bus 10 through the AND gate 50 and is supplied to the operator interface unit 22 which initiates distribution in the distribution unit 11. Switching to another input 51 can be undertaken for setting by an interface according to CCITT V.24.

A further modification present in the embodiment shown in FIG. 6 is the use of check bit generators 52 and 52' and error evaluation circuits 53 and 54. The check bit generators 52 and 52' receive parallel 8-bit code words interpret them, and attach a ninth bit to the code words as a check bit so that the code word is now nine bits in length. The error evaluation circuits 53 and 54 check the 8-bit code words at the input and the output of the distributor unit 11 for errors.

The check bit generator 52' is contained for voice and data in the frame adaptors 7 and 8. For a 64 kbit/s signal, a check bit generator 52 must be connected to the bus 10 at the output of the memory 9.

Figure 7:
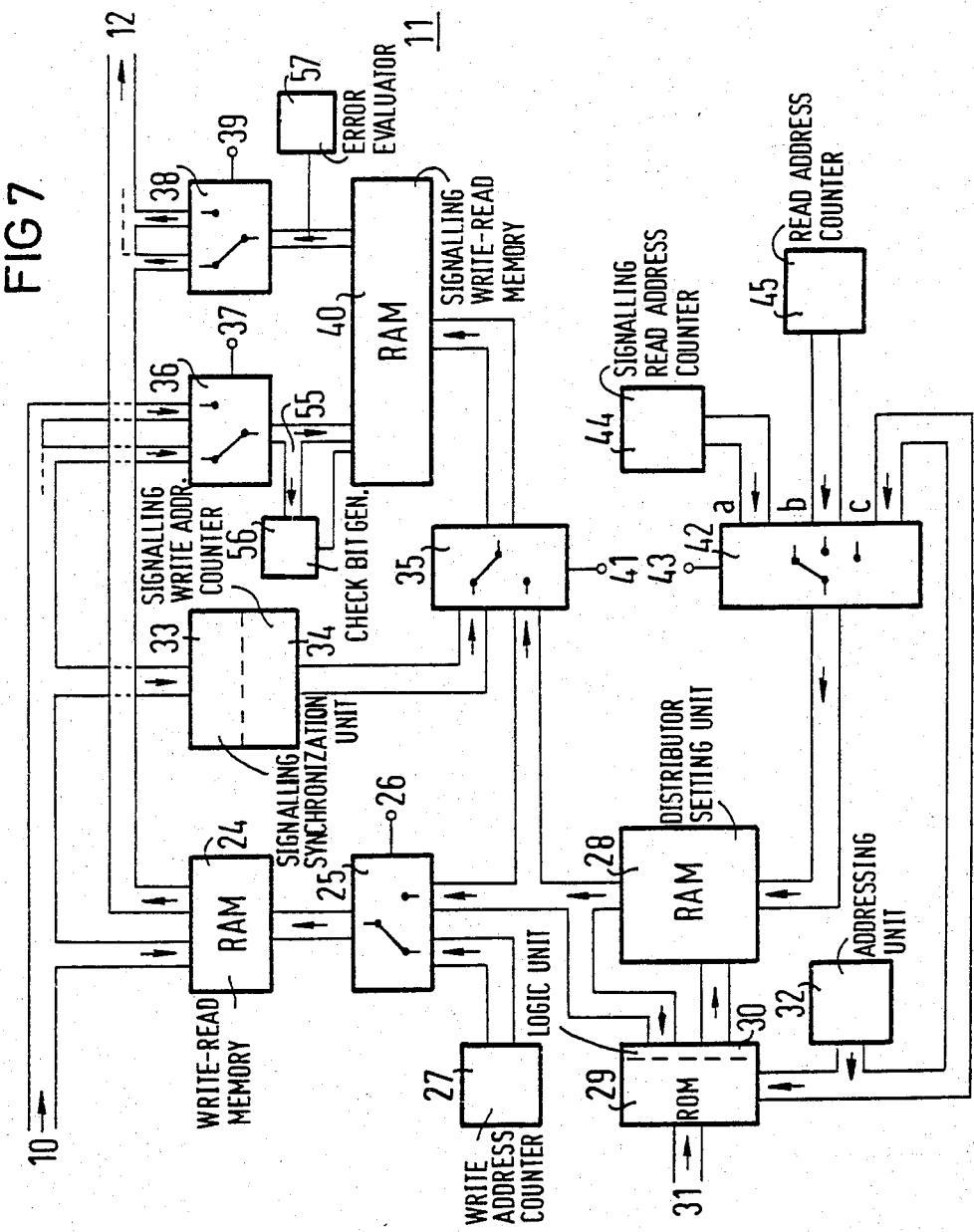
FIG. 7 is a block diagram for the distributor unit shown in FIG. 6.

A distributor unit 11 is shown in FIG. 7 having a check bit generator 56 and an error evaluator 57. The check is undertaken in the same manner as described in connection with FIG. 6. The check bit generator 56 is disposed at the input of the write-read memory 40, and the error evaluator 57 is connected at the output of the memory 40. The check bit generator may be realized by a standard integrated circuit 74LS280. All other components shown in FIG. 7 are identical to those shown in FIG. 2, and a further description thereof is unnecessary.

The details of the read only memory 29 and the associated logic unit 30 are shown in FIG. 8. The logic unit 30 contains a comparitor 58 with an error logout 59 and a bus driver 60. The comparitor 58 can be comprised of two integrated modules CD4585 manufactured by RCA, and the bus driver 64 may be a module 74LS240.

As already explained in connection with FIG. 2, the contents of the read only memory 29 are transferred to the faster distributor setting unit 28 by means of the addressing unit 32 for the purpose of distribution. The comparitor 58 monitors this procedure by receiving a readback from the setting unit 28.

Figure 9:
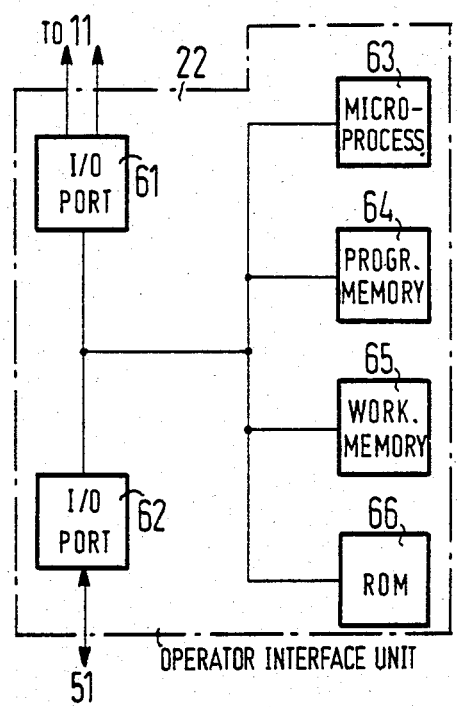
FIG. 9 is a block diagram showing the details of the operator interface unit used in the embodiments of FIGS. 1 and 6.
Figure 10:
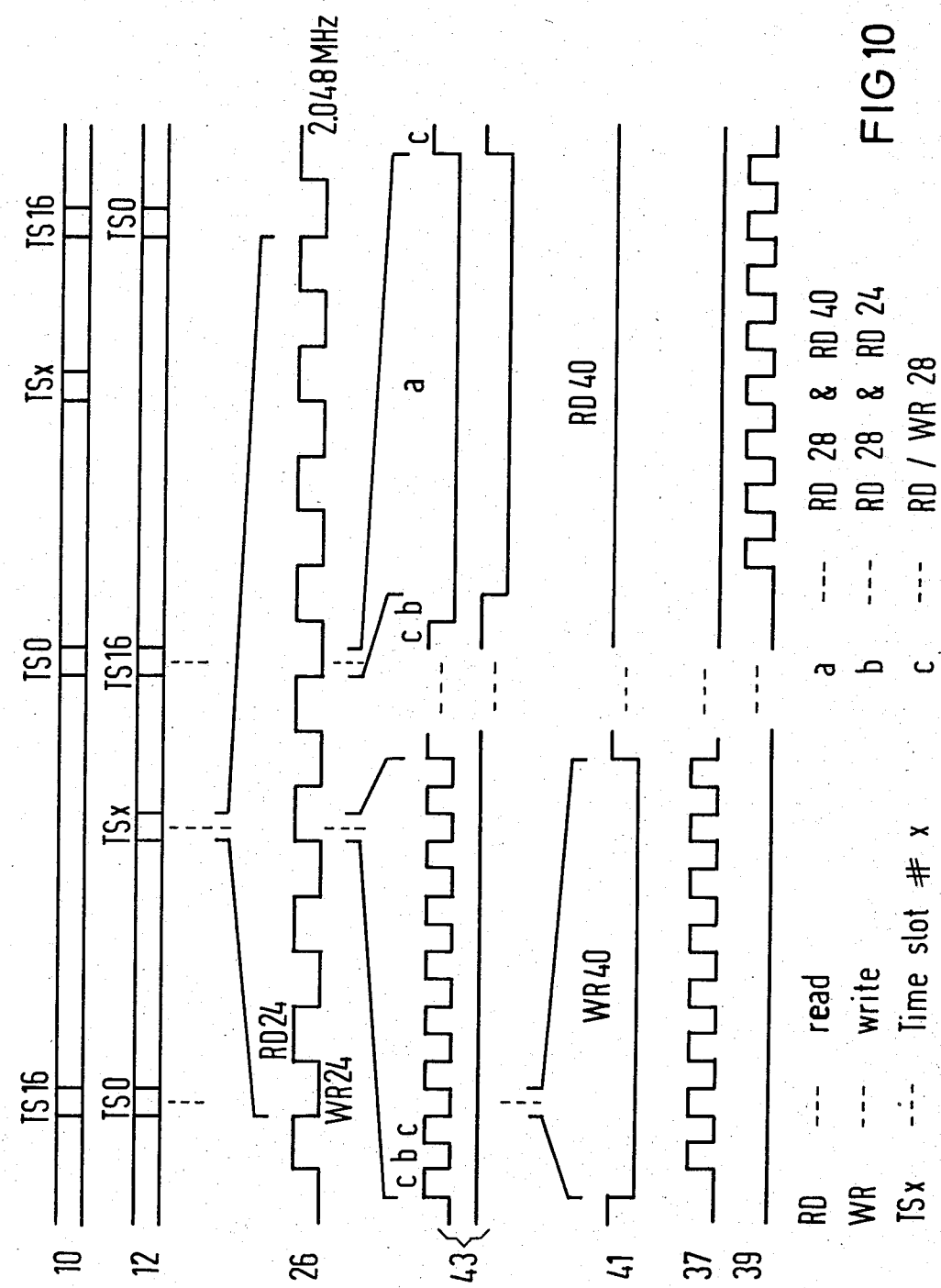
FIG. 10 shows the various pulse trains supplied by the pulse generator 23 to the respective changeover means.

The details of the operator interface 22 are shown in FIG. 9. This unit includes two input/output ports 61 and 62, a microprocessor 63, a program memory 64, a working memory 65, and a read only memory 66. The microprocessor 63 may be, for example, a module 8085 manufactured by Intel, the program memory 74 may be module 2764 of Intel, the working memory 65 may be module 6264 of Hitachi, and the read only memory 66 may be module 2817 manufactured by Intel.

Although modifications and changes may be suggested by those skilled in the art it is the intention of the inventors to embody within the patent warranted hereon all changes and modifications as reasonably and properly come within the scope of their contribution to the art.

We claim as our invention:

1. A digital signal distribution circuit for time division multiplex signals each having a same frame format and for discrete channel signals comprising:

a plurality of frame adaptor means respectively connected to a plurality of inputs of said circuit, said frame adaptor means synchronizing and storing said time division multiplex signals for forming code words therefrom;

a memory and converter means connected to another input of said circuit for converting and storing said discrete channel signals and forming code words therefrom;

a distributor means having inputs respectively connected to outputs of said frame adaptor means and said memory and converter means respectively through a first bus and first discrete lines;

a clock pulse generator for cyclically controlling feed of code words into said first bus and said first discrete lines;

an operator interface means for entering setting information into said distributor means for controlling distribution of said code words by said distributor means; and a second bus and second discrete lines connected to outputs of said distributor means and to respective outputs of said circuit to which code words distributed by said distributor means are supplied.

2. A digital signal distributor circuit as claimed in claim 1 further comprising frame former means interconnected between said second bus and respective outputs of said circuit to which code words formed from said time division multiplex signals are supplied by said distributor means.

3. A digital signal distributor circuit as claimed in claim 2 further comprising parallel-to-serial converters interconnected between each of said frame former means and said outputs of said circuit to which said code words formed from said time division multiplex signals are supplied, and parallel-to-serial converter means interconnected between said discrete lines and outputs of said circuit to which code words formed from said discrete channel signals are supplied.

4. A digital signal distributor circuit as claimed in claim 2 wherein each of said frame former means includes means for inserting auxiliary bits into said code words.

5. A digital signal distributor circuit as claimed in claim 4 wherein said auxiliary bits are indicator bits.

6. A digital signal distributor circuit as claimed in claim 4 wherein said auxiliary bits are bits for undertaking an expanded synchronization procedure on said time division multiplex signals.

7. A digitial signal distributor circuit as claimed in claim 1 wherein each of said frame adaptations means includes a serial-to-parallel converter means, and wherein said memory and converter means includes a serial-to-parallel converter means.

8. A digital signal distributor circuit as claimed in claim 1 wherein said distributor means comprises:
a write-read memory having a plurality of data inputs which form said distributor means inputs connected to said first bus, a plurality of data outputs which form said distributor means outputs connected to said second bus, and a plurality of address inputs;
a write address counter having a plurality of outputs;
a read address counter having a plurality of outputs;
a distributor setting means having data inputs connected to said operator interface means and first inputs connected to said outputs of said read address counter, and having a plurality of outputs; and
a first changeover means having first inputs connected to said outputs of said write address counter and second inputs connected to said outputs of said distributor setting means, having outputs connected to said address inputs of said write-read memory, and having a control input connected to said clock pulse generator for alternatingly connecting said address inputs of said write-read memory to said write address counter or to said read address counter.

9. A digital signal distributor circuit as claimed in claim 8 for time division multiplex signals having a plurality of 8-bit channels including a signaling channel, wherein said distributor means further comprises:
a signaling write-read memory having a plurality of data inputs, a plurality of address inputs, and a plurality of outputs;
a second changeover means having first inputs respectively connected to a first group of lines of said first bus, second inputs respectively connected to a second group of lines of said first bus, outputs respectively connected to said data inputs of said signaling read-write memory, and a control input connected to said clock pulse generator for alternatingly connecting said first or said second groups of lines of said first bus to said data inputs of said signaling write-read memory;
a third changeover means having inputs respectively connected to said outputs of said signaling write-read memory, first outputs respectively connected to a first group of lines of said second bus, second outputs respectively connected to a second group of lines of said second bus, and a control input for alternatingly connecting said outputs of said signaling write-read memory to said first or said second groups of lines of said second bus;
a combination signaling synchronization means and signaling write address counter having inputs connected to said first bus and having a plurality of outputs;
a signaling read address counter having a plurality of outputs;
a fourth changeover means having first inputs respectively connected to said outputs of said signaling read address counter, second inputs respectively connected to said outputs of said read address counter, outputs respectively connected to said second inputs of said distributor setting means, and a control input for connecting said outputs of said signaling read address counter or said outputs of said read address counter to said second inputs of said distributor setting means in a selected sequence; and
a fifth changeover means having first inputs respectively connected to said outputs of said combination signaling synchronization means, second inputs respectively connected to said outputs of said distributor setting means, outputs connected to said address inputs of said signaling write-read memory, and a control input connected to said clock pulse generator operating in combination with said control input of said fourth changeover means for alternatingly connecting said outputs of said combination signaling synchronization means and signaling write address counter and said outputs of said signaling read address counter through said distributor setting means to said address inputs of said signaling write-read memory.

10. A digital signal distributor circuit as claimed in claim 9 wherein said distributor means further comprises:
an addressing unit having a plurality of outputs; and
said fourth changeover means having third inputs respectively connected to said outputs of said addressing unit, and said control input of said fourth changeover means connecting said outputs of said addressing unit to said address inputs of said distributor setting means in said selected sequence.

11. A digital signal distributor circuit as claimed in claim 10 wherein said distributor means further comprises:
a combination read only memory and logic unit interconnected between said operator interface means and said distributor setting means, said combination read only memory and logic unit having setting inputs connected to said operator interface means, data inputs connected to said outputs of said distributor setting means, data outputs connected to said data inputs of said distributor setting means, and address inputs connected to said outputs of said addressing means.

12. A digital signal distributor circuit as claimed in claim 11 wherein said read only memory and logic unit includes a comparitor means and wherein said read only memory and logic units stores addresses received from said operator interface means and transmits said stored addresses to said distributor setting means in accordance with setting signals received from said operator interface means and compares said addresses transmitted to said distributor setting means with addresses received from said outputs of said distributor setting means for detection of errors.

13. A digital signal distributor circuit as claimed in claim 11 wherein said read only memory and logic unit includes an erasable programmable read only memory.

14. A digital signal distributor circuit as claimed in claim 13 wherein said erasable programmable read only memory is an electrically erasable programmable read only memory.

15. A digital signal distributor circuit as claimed in claim 13 wherein said erasable programmable read only memory is a read only memory erasable by means of ultraviolet light.

16. A digital signal distributor circuit as claimed in claim 9 wherein said write-read memory, said signaling write-read memory and said distributor setting means are each random access memories.

17. A digital signal distributor circuit as claimed in claim 16 wherein said random access memories have data inputs also functioning as data outputs.

18. A digital signal distributor circuit as claimed in claim 9 wherein said write address counter, said signaling read address counter and said read address counter are combined in a single counter unit.

19. A digital signal distributor circuit as claimed in claim 9 further comprising an intermediate memory interconnected between one of said first or second groups of lines of said first bus and the corresponding first or second inputs of said second changeover means connected thereto.

20. A digital signal distributor circuit as claimed in claim 9 wherein said third changeover means comprises:
   a gate means having first and second inputs and to which said third changeover means control input is connected and having outputs alternatingly functioning as said first outputs or said second outputs of said third changeover means in dependence upon a signal received at said control input;
   first and second branches of said third changeover means inputs respectively connected to said first and second inputs of said gate means; and
   an intermediate memory disposed in one of said branches.

21. A digital signal distributor circuit as claimed in claim 9 wherein said code words include identifiers transmitted in an identifier superframe, and wherein said combination signaling synchronization means and signaling write address counter receive said identifier superframe and controls writing in of said identifiers into said signaling write-read memory.

22. A digital signal distributor circuit as claimed in claim 21 wherein said identifiers are 8-bit identifier consisting of 4-bit words transmitted in a double identifier superframe.

23. A digital signal distributor circuit as claimed in claim 21 wherein said identifiers are 4-bit identifiers.

24. A digital signal distributor circuit as claimed in claim 9 wherein said code words on said first bus include a bit for remote setting of said distributor means, and further comprising an AND gate having an output connected to an input of said operator interface unit, and inputs respectively connected to said clock pulse generator and to said first bus.

25. A digital signal distributor circuit as claimed in claim 9 wherein said code words transmitted by said discrete lines include a bit for remote setting of distributor means, and further comprising an AND gate having an output connected to said oerator interface unit and having inputs respectively connected to said clock pulse generator and to one of said discrete lines.

26. A digital signal distributor circuit as claimed in claim 1 further comprising:
   a check bit generator connected to said first bus for attaching a check bit to said code words transmitted by said first bus; and
   an evaluator means connected to said distributor means for detecting errors based on said check bit.

27. A digital signal distributor circuit as claimed in claim 26 wherein said error evaluator means is connected to said inputs of said distributor means.

28. A digital signal distributor circuit as claimed in claim 26 wherein said error evaluator means is connected to said outputs of said distributor means.

29. A digital signal distributor circuit as claimed in claim 1 further comprising:
   a check bit generator connected to said discrete lines for attaching a check bit to said code words transmitted thereby; and
   an evaluator means connected to said distributor means for detecting errors based on said check bit.

30. A digital signal distributor circuit as claimed in claim 29 wherein said evaluator means is connected to said inputs of said distributor means.

31. A digital signal distributor circuit as claimed in claim 29 wherein said evaluator means is connected to said outputs of said distributor means.

* * * * *